United States Patent [19]

Aron

[11] 4,010,129

[45] Mar. 1, 1977

[54] NOVEL PROCESSING AIDS FOR NATURAL AND SYNTHETIC RUBBER COMPOUNDS

[75] Inventor: Erwin Aron, Clifton, N.J.

[73] Assignee: Technical Processing, Inc., Paterson, N.J.

[22] Filed: Apr. 28, 1975

[21] Appl. No.: 572,326

Related U.S. Application Data

[63] Continuation-in-part of Ser. No. 430,556, Jan. 3, 1974, Pat. No. 3,882,062, which is a continuation-in-part of Ser. No. 421,689, Dec. 4, 1973, abandoned, which is a continuation-in-part of Ser. No. 411,975, Nov. 1, 1973, abandoned.

[52] U.S. Cl. .................. 260/23.7 M; 252/52 R; 260/31.4 R; 260/33.4 R; 260/33.6 A; 260/79.5 NV; 260/752
[51] Int. Cl.² ........................... C08L 91/00
[58] Field of Search .............. 260/752, 23.7 M; 252/40, 52, 33.6 A, 33.4 R, 31.4 R, 79.5 NV

[56] References Cited

UNITED STATES PATENTS

| | | | |
|---|---|---|---|
| 3,201,361 | 8/1965 | Aron | 260/23.7 M |
| 3,268,493 | 8/1966 | Reynolds | 260/79.5 |
| 3,494,900 | 2/1970 | Moritg | 260/79.5 |
| 3,787,341 | 1/1974 | Aron | 260/23.7 M |
| 3,882,062 | 5/1975 | Aron | 260/23.7 M |

*Primary Examiner*—Lewis T. Jacobs
*Assistant Examiner*—William E. Parker
*Attorney, Agent, or Firm*—Kenyon & Kenyon

[57] ABSTRACT

Compositions containing salts of aromatic sulfonic acids, long chain fatty acids and thioethers are useful in the processing of natural and synthetic rubber by permitting the usual peptizing step of such processing to be omitted.

8 Claims, No Drawings

NOVEL PROCESSING AIDS FOR NATURAL AND SYNTHETIC RUBBER COMPOUNDS

This application is a continuation-in-part of my prior application Ser. No. 430,566 filed Jan. 3, 1974 for "Novel Processing Aids for Natural and Synthetic Rubber Compounds," now U.S. Pat. No. 3,882,062, which in turn was a continuation-in-part of application Ser. No. 421,689 filed Dec. 4, 1973, of the same title, now abandoned, which in turn was a continuation-in-part of application Ser. No. 411,975 filed Nov. 1, 1973, of the same title, now abandoned.

BACKGROUND OF THE INVENTION

Crude natural rubber is generally quite high in viscosity and therefore does not mix easily and quickly with the many additives used during processing. To facilitate the addition of these additives, the rubber usually is softened by undergoing a preliminary step called mastication.

The rubber is placed into a usual mixer, such as the Banbury, and is subjected to heat and a plasticizer (peptizer), while being mixed for several minutes. The resulting mixture is then dumped, sheeted on a roll mill and cooled. The softened rubber then under goes the mixing step.

The processing aids of my earlier copending application Ser. No. 263,752 filed June 12, 1972, now U.S. Pat. No. 3,737,341 issued Jan. 22, 1974 were developed to eliminate the need for the mastication step. These compositions are added directly to the crude rubber in the mixing cycle along with the other additives. In addition to facilitating the breaking of the polymer and the elimination of the need for both the mastication step and the peptizer, these compositions have other beneficial effects in rubber compounding. They reduce the mixing time required for rubber compounding and provide for better dispersal of additives than traditional methods. In addition, they enable the use of lower mixing temperatures and provide for improved flow, improved physical properties, improved mixing and extruding characteristics, and improved physical characteristics of the rubber. Hence, even the compounding of synthetic rubber requiring no premastication will be enhanced by the use of these formulations.

The compositions of my prior invention are homogeneous mixtures of:

1. alkali or amine salts of aromatic sulfonic acids having the general formula:

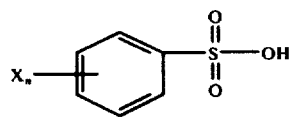

wherein X can be either hydrogen or a branched or straight chain alkyl group having from 4 to 14 carbon atoms, and preferably about 8 to 12 carbon atoms; and n has a value of from 1 to 5, and preferably 1; and 2. long chain fatty acids having a maximum of about 22 carbon atoms in the chain, such as, but not limited to, stearic acid, palmitic acid, oleic acid, neodecanoic acid and mixtures of such acids. The fatty acids should be present in amounts at least about equal to the amount of sulfonates but may be present in substantial excess if desired.

It then was found in accordance with the invention of my prior copending application, of which this is a continuation-in-part, that thioethers catalyze the action of my prior compositions. In particular, they promote further reduction in the viscosity of the rubber compound. This results in a reduced energy input to effect compounding. In addition, it enables mixing of the rubber compound at lower temperatures, thereby minimizing the danger of scorching the rubber compound.

It now has been found in accordance with the present invention, that the thioethers not only catalyze the action of the prior sulfonate salt/fatty acid compositions, but they permit a reduction, and even the elimination of the fatty acid without adverse effect on the properties or processing of the rubber compound. This reduction or elimination of the fatty acid represents a significant saving in the cost of the processing aids of this invention.

Thus, the compositions of this invention, unlike those of application Ser. No. 430,566 (U.S. Pat. No. 3,882,062) are homogeneous mixtures of:

1. An alkali salt of aromatic sulfonic acids as defined above;
2. optionally, a fatty acid as defined above, provided the amount of fatty acid is less than that of the sulfonic acid salt; and
3. a thioether as defined herein below.

The thioethers which are employed in accordance with this invention are those of the formula:

wherein Y is sulfur or dithioalkylene, i.e. — $SC_xH_{2x}S$ — wherein X has a value of from 1 to about 5, and preferably is 1; and each of $R^1$ and $R^2$ is alkyl, aryl, alkaryl, aralkyl as well as substituted alkyl, aryl, alkaryl and aralkyl. The precise nature of $R^1$ and $R^2$ is not highly critical, provided the thioether is sufficiently non-volatile to remain in the rubber compound for a sufficient period of time to provide effective catalyzing action. In general, thioethers having boiling points in excess of about 130° C are sufficiently non-volatile to be useful in accordance with the invention. In addition, the size of the compound should be such that sufficient catalytic activity can be imparted with relatively small amounts of thioether. Accordingly, each of $R^1$ and $R^2$ preferably contains no more than about 12 carbon atoms. Lastly, substituents, if any, should be inert and compatible with the compounds of this invention as well as with the ultimate rubber compound into which they will be incorporated. Suitable substituents include ether oxygen, carbonyl oxygen (i.e. keto, ester and carboxyl groups), cyano, amine nitrogen (primary, secondary or tertiary), amide groups and the like.

A preferred class of thioethers comprise thiodicarboxylic acids and their lower alkyl ethers of the formula:

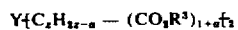

wherein Y is as defined above; z is a numbr having a value of from 1 to about 2; a is a number having a value of from about 0 to about 1; and $R^3$ is hydrogen or lower alkyl of up to about 3 carbons. Typical thioethers include thio-diglycolic acid, thiodipropionic acid, methylene bis (thioacetic acid), dimethyl thiodipropionate, thiodisuccinic acid, thiodipropionitrile, and dibenzyl sulfide.

The thioether is believed to act as a catalyst. In particular, it is believed that the alkali metal sulfonate component of my prior composition is converted in part into the corresponding sulfonic acid which acts as a peptizer during the compounding process, and that the thioether catalyzes the peptizing action of the sulfonic acid. This theory is offered soley by way of explanation, however, and it is not intended to limit the invention to this theory.

Regardless of theory, the amount of thioether sufficient to achieve a reduction in compound viscosity and mixing temperature is small, generally not more than 25 percent of the sulfonate salt. The thioether preferably is employed in amounts of from about 5 to about 10 percent based upon the weight of the sulfonate salt, or from about 1 to about 3 percent based upon the combined weight of sulfonate salt and fatty acid, when the fatty acid is present.

The resulting composition is blended with the rubber at the beginning of the mixing cycle. The amount of the composition necessary to achieve improved compounding ordinarily is from about 0.5 to about 2 percent, and preferably about 0.9 to about 1.5 percent, based upon the weight of the rubber in the compound. As a result, the thioether is present in the compound at levels of only 0.005 to about 0.06 percent, based upon the rubber. Nonetheless the incorporation of such small amounts of the thioether has a material effect on reducing compound viscosity and compounding temperatures.

The sulfonate salts which are disclosed in my prior applications are the alkali metal and amine salts. It now has been found that other salts of the sulfonic acids may be employed, including salts of alkaline earth metals such as magnesium, calcium and barium, as well as other bivalent metals such as zinc.

The composition of this invention preferably is mixed with suitable materials to facilitate its introduction into the rubber. Such materials include esters and ethers of aromatic alcohols, polyglycols, etc. Suitable additional materials include these comprising the compositions of the invention of my copending application, Ser. No. 128,549, of Mar. 26, 1971. These generally comprise aromatic esters, compounds with alcoholic and glycolic hydroxyl groups, potassium or sodium soaps of fats or fatty acids, metal soaps of zinc, magnesium, calcium or barium, and a paraffin. Specifically, these additional materials may comprise:

a. From about 5 to 15% aromatic esters selected from groups consisting of (1) di- aryl- and di-arylalkyl phthalates, (2) di- aryl- and arylalkyl mono-glycolether phthalates, (3) phthalates from polyglycol mono-ethers of aryl, aralkyl and alkaryl compounds wherein the polyglycol chain contains from 2 to 6 ethylene oxide groups in the chain, (4) di-benzoates of glycol and propyleneglycol, and their di- and tri-mers; and (5) mixtures of the above.

b. From about 5% to about 30% of compounds with alcoholic or glycolic hydroxyl groups selected from (1) straight or branched chain aliphatic alcohols having from about 8 to about 20 carbons in the chain, (2) alkyl-phenoxy ethers of glycols or polyglycols wherein the alkyl group is limited to about 12 carbons in the chain, and the polyclycol grouping does not contain more than about 6 ($CH_2$—$CH_2$—O—) groups, (3) polypropylene glycol of about three propylene oxide groups in the molecule, and (4) mixtures of the above.

c. From about 5 to about 15% of potassium or sodium soaps made from commercial mixtures of fats or fatty acids containing from about 12 to about 18 carbon atoms in the chain, said chains having only a small degree of unsaturation, with more than 50% of them having 18 carbon atoms in the chain, said chains having only a small degree of unsaturation, with more than 50% of them having 18 carbon atoms in the chain.

d. From about 10 to about 30% of fatty acids having from about 12 to about 18 carbon atoms in the chain, said chains having only a small degree of unsaturation, with more than 50% of them having 18 carbon atoms in the chain.

e. From about 5 to about 10% of a metal soap where the metal is selected from the group consisting of zinc, magnesium, calcium or barium; and the fatty acid part of the soap has from about 12 to about 18 carbon atoms in the chain and contains a high percentage of chains with a single double bond in the chain.

f. From about 15 to about 60% of hydrocarbons selected from the group consisting of mineral oil, mineral waxes, and petrolatum, or mixtures of them.

Preferably the potassium or sodium soaps of (c) above or the fatty acids of (d) above are compounds which have iodine values in the range of from about 5 to about 15. The metal soaps of (e) above are moe unsaturated and have iodine values in the range of about 80 to about 95.

Typical aromatic esters of (a) above which may be used in the compositions of this invention are dibenzyl phthalate; diphenyl phthalate; bis (2-phenoxyethyl) phthalate; bis(nonylphenoxyethyl) phthalate; bis(-nonylphenoxytetraethyleneglycol) phthalate; benzyl dodecylphenoxyhexaethyleneglycol phthalate; bis (octylphenoxy) hexaethyleneglycol phthalate; diethyleneglycol dibenzoate; dipropyleneglycol dibenzoate; and triethyleneglycol dibenzoate.

Illustrative of the compounds with alcoholic or glycolic hydroxyl groups referred to in (b) above which may be employed are 2-ethylhexanol, cetyl alcohol, stearyl alcohol, nonylphenoxyglycol, nonylphenoxydiglycol, nonylphenoxytetraethyleneglycol, dodecylhexaethyleneglycol, dipropyleneglycol, tripropyleneglycol.

Among the potassium or sodium soaps referred to in (c) above are sodium and potassium soaps of hydrogenated tallow, hydrogenated oils of vegetable or marine origin, and soaps of potassium or sodiuum made with fractions prepared from oils and fats, such fractions having iodine values from about 5 to about 15.

Typical fatty acids which may be employed are those derived from hydrogenated tallow and hydrogenated oils of vegetable or marine origin.

Illustrative of the fatty acids part of the metal soaps referred to in (e) above are oils of vegetable origin or fractions of animal fatty acids such as red oil.

Among the petroleum jellies, mineral oils, and mineral waxes, which may be employed in the compositions of this invention, are waxes having melting points of about 120 to 170° F.

However, compositions of this invention are not limited to use in combination with the above additional materials and any similar chemicals will suffice. All ingredients may be of technical grade and may contain varying amounts of related materials, by-products, etc. The novel rubber processing aids of this invention can be made by melting the ingredients together, mixing and cooling, forming a waxy solid. The additional materials may be added together with the sulfonic acid salt, fatty acid and thioether and all components heated until a clear melt is obtained. The alkali soaps and soaps of the bivalent metals can also be made in situ as is well known in the art, from the oxide, hydroxide or carbonate of the metal and the desired acids or acid anhydrides, followed by the evaporation or boiling off of the resulting water.

Formulations for solid balanced processing aids of this invention contain the following appropriate percentages by weight of compounds which are typical of their class:

3 to 50% alkali salt of aromatic sulfonic acid
0 to 50% fatty acid
0.5 to 5% thioether
0 to 15% diphenylphthalate
0 to 20% tetraethyleneglycol mono-nonylphenol ether
0 to 10% tripropyleneglycol
0 to 20% potassium stearate
0 to 10% zinc oleate
0 to 5% cetyl alcohol
0 to 40% petrolatum In general, the above-described compositions are solids. It is desirable that they be in liquid form to facilitate mixing of the composition with the rubber compound. Such liquid compositions can be achieved by the use of amine salts of the aromatic sulfonic acids disclosed above. The salts are those of amines of the formula:

and

Wherein $R^4$ is alkyl or hydroxyalkyl, each of $R^5$ or $R^6$ is hydrogen, alkyl or hydroxyalkyl, and n is a a number having a value of from 2 to 5. Preferred amines are those having a molecular weight of at least 149 which are themselves liquid and react with the aromatic sulfonic acid to form a liquid salt. Preferred amines are tertiary amines, with triethanolamine being especially preferred.

The aromatic sulfonic acid amine salt can be preformed or it can be formed in situ by adding the acid and the amine separately. In the latter case. the aromatic sulfonic acid and the amine are added in approximately equivalent amounts.

The amine salt of the sulfonic acid, the carboxylic acid and the thioether can be mixed with certain of the ingredients (a)-(f) discussed above and still afford a liquid formulation. In particular, one or more of the aromatic esters (a), the alcoholic compounds (b), and the hydrocarbon (f) can be employed. However, the metal soaps (c) and (e) are to be avoided if a liquid formulation is desired. As a result, the proportions of the additional materials are appropriately adjusted to reflect the omission of these components.

Preferred liquid formulations are those including one or more of a liquid fatty acid, a liquid aromatic ester or a liquid polyglycol. Such liquid formulations may contain:

20 to 50% salt of aromatic sulfonic acid
0 to less than 50% fatty acid
0.5 to 5% thioether
0 to 35% dipropylene glycol dibenzoate
0 to 25% tetraethyleneglycol mono-nonylphenol ether
0 to 25% tripropyleneglycol
0 to 20% mineral oil Especially preferred liquid compositions certain.

20 to 50% salt of aromatic sulfonic acid
0.5 to 5% thioether
0 to less than 50% fatty acid
5 to 35% dipropyleneglycol dibenzoate
0 to 30% tripropylene glycol As noted above, the compositions of this invention generally are added to the rubber at the beginning of the mixing cycle. The usual additives, such as pigments, fillers, vulcanizing agents., can then be added and the entire compounding performed in one operation. They may be added to any type rubber, whether it is of a natural, synthetic or reclaimed type.

The following Examples are illustrative of the present invention. The processing aids employed in the Examples are summarized in TABLE I.

| Component, wt% | COMPOUND | | | | | | | | |
|---|---|---|---|---|---|---|---|---|---|
| | A | B | C | D | E | F | G | H | I |
| Dodecylbenzene sulfonic acid | 33 | 33 | 33 | 33 | 33 | 33 | 33 | 33 | 33 |
| Triethanol amine | 15 | 15 | 15 | 15 | 15 | 15 | 15 | 15 | — |
| zinc oxide | — | — | — | — | — | — | — | — | 4 |
| 2-Ethylhexylacid | 30 | 27 | 22.5 | 15 | 7.5 | 3 | 1.5 | 0 | — |
| Oleic acid | — | — | — | — | — | — | — | — | 30 |
| Thiodipropionitrile | 3 | 3 | 3 | 3 | 3 | 3 | 3 | 3 | 3 |
| Dipropyleneglycol dibenzoate | 9 | 11 | 13.0 | 17 | 20.5 | 23 | 23.5 | 24.5 | 33 |
| tripropylene glycol | 10 | 11 | 13.5 | 17 | 21.0 | 23 | 24.0 | 24.5 | — |

EXAMPLE 1

Each of Compounds A-I was evaluated in a natural rubber tread stock consisting of

| Component | Pts by Wt |
|---|---|
| No. 3 RSS Rubber (1) | 100 |
| Stearic Acid | 2.5 |
| I SAF - N - 219 (2) | 55 |
| K - Stay- G (3) | 4 |
| Tarene - 20 (4) | 9 |
| Zinc Oxide | 5 |
| Agerite Superflex (5) | 1 |
| Agerite Dipar (6) | 1 |
| Amax (7) | 0.65 |

-continued

| Component | Pts by Wt |
|---|---|
| Sulfur | 2.50 |

(1) Ribbed smoked sheet rubber.
(2) Intermediate super abrasion furnace black
(3) A mixture of a high molecular weight sulfonic acid and a paraffin oil sold as a plasticizer and processing aid for rubber by RTVanderbilt Co.
(4) A pine tar sold as a rubber softener and extruder by National Rosin Oil & Size Co.
(5) A diphenylamine - acetone reaction product sold as an antioxidant by RTVanderbilt Co.
(6) A mixture of phenyl-1-β-naphthylamine, isopropoxydiphenyl amine and diphenyl-p-phenylenediamine sold as an antioxidant by RTVanderbilt Co.
(7) N-oxydiethylene benzothiazole-2-sulfenamide sold as an accelerator by RTVanderbilt Co.

The above stock was mixed without the additive of this invention or with 1.80 parts of one of the compounds of this invention and the mixing time, dump temperature and Mooney viscosity (ML4 at 212° F) of the resulting rubber compounds where recorded. The result of these tests are summarized in Table II below.

EXAMPLE 2

Each of the compounds of A-I was evaluated in an ethylene-propylene-diene terpolymer rubber (EDPM) compound having the following composition.

| Component | Pts by Wt |
|---|---|
| EPDM Vistalon-5600 (1) | 100 |
| Stearic | 1.5 |
| Paraffin wax | 5 |
| Clay | 180 |
| Mistron Vapor (2) | 190 |
| Sunpar 2280 (3) | 130 |
| Zinc Oxide | 5 |
| Diethylene glycol | 3 |
| MBTS (4) | 1.5 |
| ZDBDC (5) | 2.5 |
| TM TDS (6) | 0.8 |
| Sulfur | 2.0 |

(1) Ethylene-propylene-diene modified rubber sold by Exxon Chemical Co.
(2) Talc sold by Sierra Talc & Clay Co.
(3) High viscosity paraffin oil sold by Sun Oil Co.
(4) Dibenzthiazyldisulfide.
(5) Zinc dibutyldithiocarbonmate.
(6) Tetramethyl thiuram disulfide.

The above stock was mixed without the additives of this invention or with 6.26 parts by weight of one of Compounds A-I, and the mixing time, dump temperature and Mooney viscosity (ML4 at 212° F) of the resulting compounds were recorded. The results of these tests are summarized in Table II below.

TABLE II

| | CONTROL | RUBBER COMPOUND | | | | | | | | |
|---|---|---|---|---|---|---|---|---|---|---|
| | | A | B | C | D | E | F | G | H | I |
| Natural Rubber: | | | | | | | | | | |
| Mixture | 6½ | 6½ | 6½ | 6½ | 7 | 7 | 6½ | 6½ | 6½ | 6½ |
| Dump t, ° C | 290 | 230 | 230 | 230 | 230 | 230 | 230 | 225 | 230 | 215 |
| Mooney Viscosity | 58 | 49 | 68 | 62 | 54 | 48 | 43 | 46 | 50 | 44 |
| EPDM Rubber: | | | | | | | | | | |
| Mixture | 6 | 5 | 4½ | 5 | 5 | 5½ | 5 | 5 | 5 | 4½ |
| Dump t, ° C | 220 | 220 | 205 | 210 | 210 | 220 | 215 | 220 | 220 | 200 |
| Mooney Viscosity | 31 | 23 | 23 | 24 | 22 | 15 | 20 | 18 | 13 | 12 |

From the data presented in Table II, it is evident that, when a thioether is present the fatty acid may be omitted from the composition of this invention without materially adversely affecting the process of compounding rubber or the rubber obtained thereby.

Still other useful formulations within the scope of this invention include:

COMPOUND J 1.0 Parts thiodiglycolic acid
10.0 Parts tripropylene glycol
23.0 Parts tetraethyleneglycol mono-nonylphenoxyether
10.0 Parts dipropyleneglycol di-benzoate
14.0 Parts paraffinic mineral oil 100/100
20.0 Parts neodecanoic acid
15.0 Parts dodecylphenylsulfonic acid
7.0 Parts triethanolamine 99%

COMPOUND K 1.2 Parts thiodipropionic acid
9.8 tripropylene glycol
23.0 Parts tetraethyleneglycol mono-nonylphenoxyether
10.0 Parts dipropyleneglycol di-benzoate
14.0 Parts paraffinic mineral oil 100/100
20.0 Parts neodecanoic acid
15.0 Parts dodecylphenylsulfonic acid
7.0 Parts triethanolamine 99%

COMPOUND L 1.3 Parts methylene bis (thioacetic acid)
7 Parts tripropylene glycol
22 Parts tetraethyleneglycol mono-nonylphenol ether
13.4 Parts dipropyleneglycol dibenzoate 12 Parts paraffinic mineral oil 100/100
18 Parts neodecanoic acid
18 Parts dodecylphenylsulfonic acid
8.4 Parts triethanolamine 99%

COMPOUND M 1.5 Parts dimethyl thiodipropionate
9 Parts tripropylene glycol
24 Parts tetraethyleneglycol mono-monylphenol ether
14 Parts dipropyleneglycol dibenzoate
13.5 Parts paraffinic mineral oil 100/100
18 Parts neodecanoic acid
14 Parts dodecylphenylsulfonic acid
6 Parts triethanolamine 99%

COMPOUND N 2.0 Parts thiodisuccinic acid
9 Parts tripropylene glycol
24 Parts tetraethyleneglycol mono-nonylphenol ether
14 Parts dipropyleneglycol dibenzoate
13 Parts paraffinic mineral oil 100/100
18 Parts neodecanoic acid
14 Parts dodecylphenylsulfonic acid 6.6 Parts triethanolamine 99%

COMPOUND O 1.0 Parts Thiodipropionitrile
9 Parts tripropylene glycol
25 tetraethyleneglycol mono-nonylphenol ether
14.5 Parts dipropyleneglycol dibenzoate
14 Parts paraffinic mineral oil 100/100
18 Parts neodecanoic acid
14 Parts dodecylphenylsulfonic acid
6.5 Parts triethanolamine 99%

COMPOUND P 1.5 Parts dibenzyl sulfide
9 Parts tripropylene glycol
25 Parts tetraethyleneglycol mono-nonylphenol ether
14 Parts dipropyleneglycol dibenzoate
14 parts paraffinic mineral oil 100/100
18 Parts neodecanoic acid
14 Parts dodecylphenylsulfonic acid
6.5 Parts triethanolamine 99%

EXAMPLE 3

Two rubber compounds were prepared in a Banbury mixer by first mixing crude natural rubber, and after 1 minute Compound J and K was added. Subsequently, other additives were charged to the mixer.

| Compound Component | 1 | 2 |
|---|---|---|
| Natural Rubber (crude, No. 3 Rib Smoked Sheet) | 100 | 100 |
| Compound J | 2.0 | — |
| Compound K | — | 2.0 |
| Activated zinc salt of pentachlorothiophenol (ENDOR) | 0.80 | 0.80 |
| Mercaptobensothiozole (CAPTAX) | 1.46 | 1.46 |
| Benzothiazyl-disulfide (ALTAX) | .66 | .66 |
| Zinc dimethyldithiocarbamate (METHYL ZYMATE) | .025 | .025 |
| Tetraethylthiuram disulfide (EHTYL TUADS) | .150 | .150 |
| Zinc oxide | 5.00 | 5.00 |
| Stearic acid | 1.00 | 1.00 |
| Petrolatum | 2.00 | 2.00 |
| Whiting | 82.50 | 82.50 |
| Sulphur | 2.00 | 2.00 |

For each formulation three measurements of Mooney viscosity were made after 10 minutes of mixing and the values were averaged. The average viscosity achieved with Compounds J and K were 8.5 and 9.5, respectively.

It has been found that the thioethers also have an effect upon the accelerators employed in the rubber compound, causing increasing curing. Accordingly, the amount of accelerator can be reduced by from about 10% to about 50% to avoid the risk of over-curing. To take advantage of this effect, it may sometimes be desirable to increase the amount of thioether to up to 25%, based upon the sulfonate salt.

EXAMPLE 4

Employing procedures similar to those described in Example 3, seven crepe rubber compounds were prepared employing Compounds J, K, L, M, N, O and P. The mixing time and dump temperatures were recorded and the Mooney viscosity and the radiograph dispersion rating for each of the resulting rubber compounds were determined. The data for these experiments are summarized as follows:

| COMPOUND COMPONENT | 1 | 2 | 3 | 4 | 5 | 6 | 7 |
|---|---|---|---|---|---|---|---|
| Pale crepe, pts | 300 | 300 | 300 | 300 | 300 | 300 | 300 |
| Stearic acid, pts | 15 | 15 | 15 | 15 | 15 | 15 | 15 |
| Zinc oxide, pts | 15 | 15 | 15 | 15 | 15 | 15 | 15 |
| Fine clay, pts | 450 | 450 | 450 | 450 | 450 | 450 | 450 |
| a-Pinene resin, pts | 25 | 25 | 25 | 25 | 25 | 25 | 25 |
| Sulfur, pts | 9 | 9 | 9 | 9 | 9 | 9 | 9 |
| Dibenzthiazyldisulfide, pts | 3.3 | 3.3 | 3.3 | 3.3 | 3.3 | 3.3 | 3.3 |
| Compound J, pts | 8 | — | — | — | — | — | — |
| Compound K, pts | — | 8 | — | — | — | — | — |
| Compound L, pts | — | — | 8 | — | — | — | — |
| Compound M, pts | — | — | — | 8 | — | — | — |
| Compound N, pts | — | — | — | — | 8 | — | — |
| Compound O, pts | — | — | — | — | — | 8 | — |
| Compound P, pts | — | — | — | — | — | — | 8 |
| TEST DATA | | | | | | | |
| Mixing time, Minutes | 8 | 8 | 9 | 9 | 10 | 7 | 8 |
| Dump Temperature, °F | 210 | 210 | 215 | 212 | 215 | 210 | 215 |
| Mooney Viscosity | 6 | 6 | 4 | 5 | 5 | 4 | 4 |
| Radiograph Dispersion Rating | 22.7 | 21.9 | 22.2 | 27.5 | 17.8 | 14.5 | 24.2 |

What is claimed is:

1. An improved rubber processing aid comprising:
   a. an alkali or amine salt of an aromatic sulfonic acid having the formula:

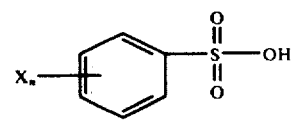

where X is hydrogen or alkyl of from 4 to 14 carbon atoms and n has a value of from 1 to 5, and
   b. optionally a long chain fatty organic acid having a maximum of about 22 carbon atoms in the chain
the improvement wherein the amount by weight of said fatty acid present is less than the amount by weight of said sulfonic acid salt, and said processing aid includes a thioether in an amount sufficient to catalyze the peptizing action of said salt.

2. A composition according to claim 1 wherein said thioether is a thiodicarboxylic acid or an ether thereof of the formula

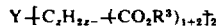

wherein Y is sulfur or —$SC_xH_{2x}S$—; $x$ has a value of from 1 to 5; $z$ has a value of from 1 to 2; $a$ has a value of from 0 to 1; and $R_3$ is hydrogen or lower alkyl.

3. A composition according to claim 1 wherein said thioether is thiodipropionitrile.

4. A composition according to claim 1 comprising 20% to 50% salt of aromatic sulfonic acid, 0.5 to 5% thioether, 0% to less than 50% fatty acid; 5 to 35% dipropylene glycol dibenzoate, and 0 to 30% tripropylene glycol.

5. A composition according to claim 4 which is free of fatty acid.

6. A composition according to claim 5 wherein said thioether is thiodipropionitrile.

7. An improved rubber composition comprising a rubber base and rubber additives, wherein the improvement comprises a small but effective amount of a composition according to claim 1.

8. An improved method for compounding rubber comprising admixing rubber with an additive of the class consisting of pigments, fillers and vulcanizing agents, wherein the improvement comprises admixing a composition according to claim 1 with rubber at the beginning of the mixing cycle prior to mastication of the rubber and no later than the time when said rubber is admixed with said additive.

* * * * *